United States Patent
Ulbricht

(10) Patent No.: US 9,283,958 B2
(45) Date of Patent: Mar. 15, 2016

(54) METHOD AND DEVICE FOR ASSISTING IN RETURNING A VEHICLE AFTER LEAVING A ROADWAY

(71) Applicant: Conti Temic microelectronic GmbH, Nuernberg (DE)

(72) Inventor: Dirk Ulbricht, Wangen (DE)

(73) Assignee: Conti Temic microelectronic GmbH, Neurnberg (DE)

( * ) Notice: Subject to any disclaimer, the term of this patent is extended or adjusted under 35 U.S.C. 154(b) by 0 days.

(21) Appl. No.: 14/387,958

(22) PCT Filed: Sep. 3, 2013

(86) PCT No.: PCT/DE2013/200148
§ 371 (c)(1),
(2) Date: Sep. 25, 2014

(87) PCT Pub. No.: WO2014/053127
PCT Pub. Date: Apr. 10, 2014

(65) Prior Publication Data
US 2015/0046015 A1 Feb. 12, 2015

(30) Foreign Application Priority Data
Oct. 1, 2012 (DE) .......................... 10 2012 109 310

(51) Int. Cl.
*B60T 7/22* (2006.01)
*B62D 1/00* (2006.01)
(Continued)

(52) U.S. Cl.
CPC ............... *B60W 30/00* (2013.01); *B60W 10/18* (2013.01); *B60W 10/20* (2013.01); *G08G 1/167* (2013.01)

(58) Field of Classification Search
USPC ........ 701/1, 23, 300, 36, 41, 45, 70; 303/191; 340/436; 702/167
See application file for complete search history.

(56) References Cited

U.S. PATENT DOCUMENTS 6,926,374 B2 * 8/2005 Dudeck et al. ............ B60T 7/22
303/191
7,187,445 B2 3/2007 Schanz et al.
(Continued)

FOREIGN PATENT DOCUMENTS

DE 100 36 276 2/2002
DE 102005039167 2/2007
(Continued)

OTHER PUBLICATIONS

International Search Report of the International Searching Authority for International Application PCT/DE2013/200148, mailed Dec. 11, 2013, 2 pages, European Patent Office, HV Rijswijk, Netherlands.
(Continued)

*Primary Examiner* — Adam Tissot
(74) *Attorney, Agent, or Firm* — W. F. Fasse

(57) ABSTRACT

A method for assisting a driver in returning a vehicle to a roadway from a periphery or shoulder of the roadway includes the following steps. Data is received from a sensor that monitors a region ahead of the vehicle. The data is analyzed to detect a transition between the roadway and the periphery, and to detect a free space ahead of the vehicle on the roadway. It is assessed whether the transition at a transition point is suitable for returning the vehicle to the roadway, and a corresponding first signal is issued. It is assessed whether the free space is sufficient for returning the vehicle and/or whether obstacles are present, and a corresponding second signal is issued. An output signal is generated based on the first and second signals, and alerts the driver or autonomously or semi-autonomously controls the vehicle to return the vehicle onto the roadway.

16 Claims, 4 Drawing Sheets

(51) Int. Cl.
*B60W 30/00* (2006.01)
*G08G 1/16* (2006.01)
*B60W 10/18* (2012.01)
*B60W 10/20* (2006.01)

(56) References Cited

U.S. PATENT DOCUMENTS

| | | | |
|---|---|---|---|
| 7,411,486 | B2 | 8/2008 | Gern et al. |
| 8,301,344 | B2 | 10/2012 | Simon et al. |
| 8,457,359 | B2 | 6/2013 | Strauss et al. |
| 8,466,806 | B2 | 6/2013 | Schofield |
| 8,543,254 | B1 | 9/2013 | Schut et al. |
| 8,615,357 | B2 | 12/2013 | Simon |
| 9,132,837 | B2 | 9/2015 | Schlensag et al. |
| 2006/0151223 | A1 | 7/2006 | Knoll |
| 2010/0256869 | A1 | 10/2010 | Lich et al. |
| 2014/0152432 | A1 | 6/2014 | Zobel et al. |
| 2014/0249722 | A1 | 9/2014 | Hegemann et al. |

FOREIGN PATENT DOCUMENTS

| | | |
|---|---|---|
| DE | 102008020007 | 10/2008 |
| DE | 102007029909 | 1/2009 |
| DE | 102009050941 | 5/2011 |
| WO | WO 2005/013235 | 2/2005 |

OTHER PUBLICATIONS

PCT Written Opinion of the International Searching Authority for International Application PCT/DE2013/200148, mailed Dec. 11, 2013, 12 pages, European Patent Office, Rijswijk, Netherlands.

German Search Report for German Patent Application No. 10 2012 109 310.5, dated Jun. 3, 2013, 4 pages, Muenchen, Germany, with English translation, 4 pages.

\* cited by examiner

METHOD AND DEVICE FOR ASSISTING IN RETURNING A VEHICLE AFTER LEAVING A ROADWAY

FIELD OF THE INVENTION

The invention relates to a method and a device for assisting in guiding or returning a vehicle back onto a roadway after the vehicle has driven off a lateral edge of the roadway, said method and device being particularly suited for a driver assistance system.

BACKGROUND INFORMATION

In the course of time a step may form, partly due to erosion, between the roadway pavement and the unpaved side strip of a roadway, or the shoulder (herein also referred to as roadway periphery). If the wheels on one side of the vehicle enter the shoulder in such areas, the vehicle often becomes instable when returning it to the roadway, because many drivers try to steer the vehicle onto the roadway applying a large steering angle, and the vehicle follows this steering angle abruptly as soon as it is on the roadway again, or the tire has been damaged and lost air due to an edge formed by the step. There are systems which are intended to prevent unintentionally leaving a lane of a roadway, so-called lane keeping assistants. Such systems can usually be overridden by the driver, however, e.g. to enable avoiding an obstacle, and therefore cannot prevent the vehicle from getting into the situation described above when driving over a step between the roadway and the shoulder. It is exactly for situations like these that assistance to the driver would be desirable, especially to prevent the vehicle being returned from becoming instable when driving over a step between the roadway and the shoulder which is too high.

SUMMARY OF THE INVENTION

The object of embodiments of the present invention is to propose a method and a device for assisting in returning a vehicle to a roadway after the vehicle has left the roadway, said method and device being particularly suited for a driver assistance system.

To reduce or even prevent instabilities when returning a vehicle from a roadway periphery to the roadway, the speed of the vehicle could be reduced significantly before the vehicle is steered back onto the roadway, or the vehicle could be steered onto the roadway again in an area where the difference between the roadway periphery and the roadway is as small as possible, for example a height difference between the periphery and the roadway is considerably smaller or the periphery is considerably narrower than in other areas. Recent years have seen an increased use of driver assistance systems in vehicles, said systems having driving environment sensors such as cameras or imaging radars by means of which the space ahead of the vehicle can be monitored and the roadway can be searched for markings and measured as to its contour. One idea of the invention is now to analyze the data generated by such driving environment sensors in order to generate a feedback signal for assisting in returning the vehicle to the roadway. The feedback signal can then serve as a purely passive support, for example, for assisting a driver in returning the vehicle, or it can be further processed to generate signals for controlling a semi-autonomous or even autonomous process of returning the vehicle by means of a corresponding system, thereby actively assisting in returning the vehicle. In practice, a transition between the roadway and a roadway periphery is determined from the data supplied by driving environment sensors. Subsequently an evaluation is made as to how this transition affects returning the vehicle to the roadway. Based on this evaluation and if there is free space ahead of the vehicle which is sufficient for returning the vehicle, a feedback signal can be generated which can then be further used, for example, for providing signals to a driver or for (semi-)autonomous interventions in the drive control system such as automatic (one-sided) braking, targeted acceleration and/or steering interventions.

One embodiment of the invention now relates to a method for assisting in returning a vehicle after leaving a roadway, said method comprising the following steps:

receiving data from one or more driving environment sensors of the vehicle capturing the roadway in a region ahead of the vehicle, analyzing the received data for detecting a transition between the roadway and a roadway periphery, analyzing the received data for detecting a free space ahead of the vehicle, checking whether the detected transition is noncritical for returning the vehicle to the roadway and issuing a corresponding first signal, checking whether the detected free space is sufficient for returning the vehicle and/or whether obstacles are present on the roadway periphery or the detected transition and issuing a corresponding second signal, and generating a feedback signal if the first signal signals that the detected transition is noncritical and the second signal signals that the free space is sufficient or if the second signal signals the presence of obstacles on the roadway periphery or the detected transition.

Analyzing the received data for detecting a transition between the roadway and a roadway periphery can include detecting a height difference between the roadway periphery and the roadway and/or the width of the roadway periphery, and checking whether the detected transition is noncritical for returning the vehicle to the roadway can include checking whether the detected height difference or the detected width is smaller than a predefined threshold value.

Checking whether the detected transition is noncritical for returning the vehicle to the roadway can include the following:

classifying the detected transition as to its influence on driving stability when being driven over by the vehicle, and issuing the first signal if the transition is classified as having less influence on driving stability when being driven over than a predefined maximum influence.

A steering assist signal, a brake intervention signal and/or an acceleration signal can be generated and issued as a function of the feedback signal.

The data received from the driving environment sensor(s) should include in particular information for detecting and evaluating a surface contour of the ground ahead of the vehicle and the free space ahead of the vehicle.

A further embodiment of the invention relates to a device for assisting in returning a vehicle after leaving a roadway, with an analyzation unit designed to receive data from one or more driving environment sensors of the vehicle capturing the roadway in a region ahead of the vehicle, analyze the received data for detecting a transition between the roadway and a roadway periphery, analyze the received data for detecting a free space ahead of the vehicle, check whether the detected transition is noncritical for returning the vehicle to the roadway and issue a corresponding first signal, check whether the detected free space is sufficient for returning the vehicle and issue a corresponding first signal, generate a feedback signal if the first signal signals that the detected transition is noncritical and the second signal signals that the free space is sufficient.

The analyzation unit can further be designed to carry out a method according to the invention and as described herein.

Finally one embodiment of the invention relates to a driver assistance system with a device according to the invention and as described herein.

The driver assistance system must comprise a signaling device signaling a generated feedback signal to the driver.

The driver assistance system can further be designed to generate control signals for the drive control system and/or steering of a vehicle as a function of the feedback signal such that the drive control system or steering of the vehicle returns the vehicle semi-autonomously or autonomously to a roadway.

BRIEF DESCRIPTION OF THE DRAWINGS

Further advantages and possibilities of application of the present invention will become apparent from the following description in conjunction with the exemplary embodiment(s) illustrated in the drawing(s).

In the description, the claims, the abstract and the drawing(s) the terms and their associated reference numerals are used as given in the attached list of reference numerals.

In the drawing(s)

Figure 1:
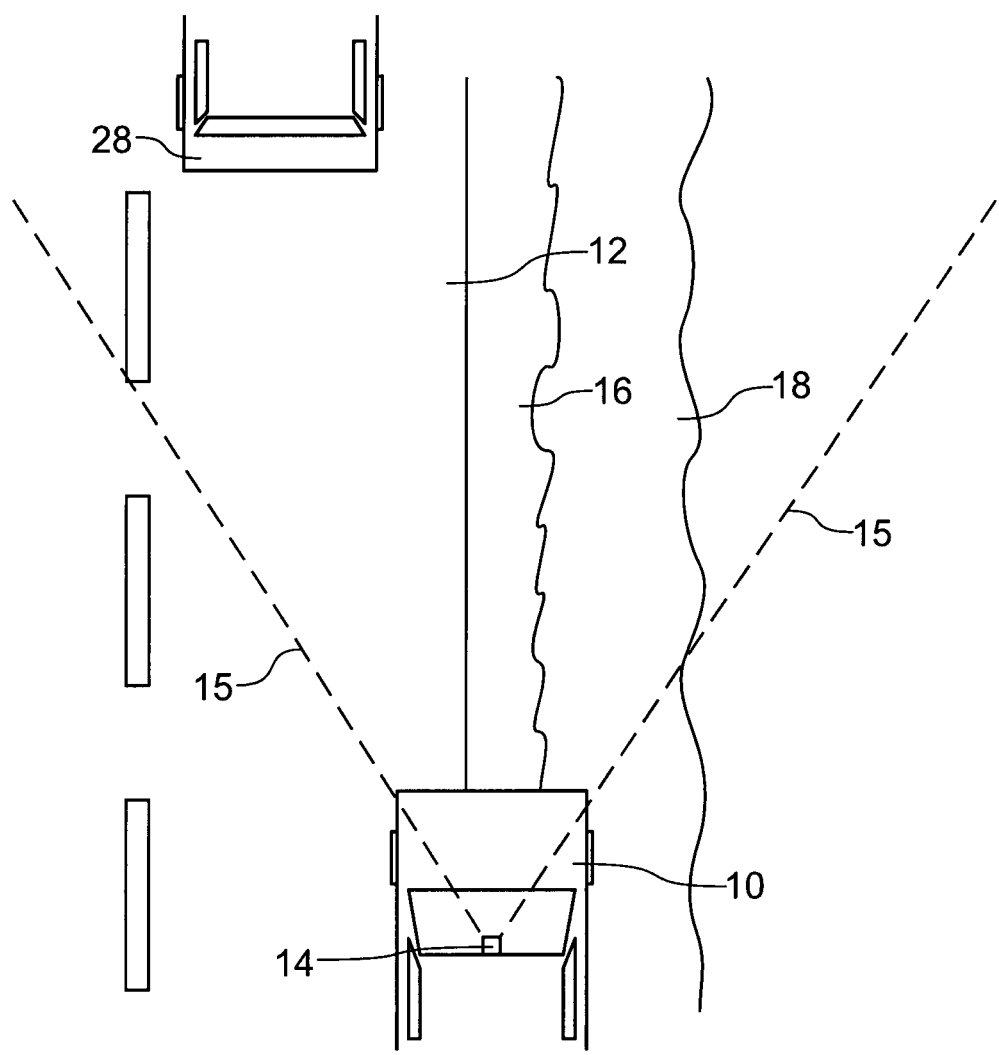
Figure 2:
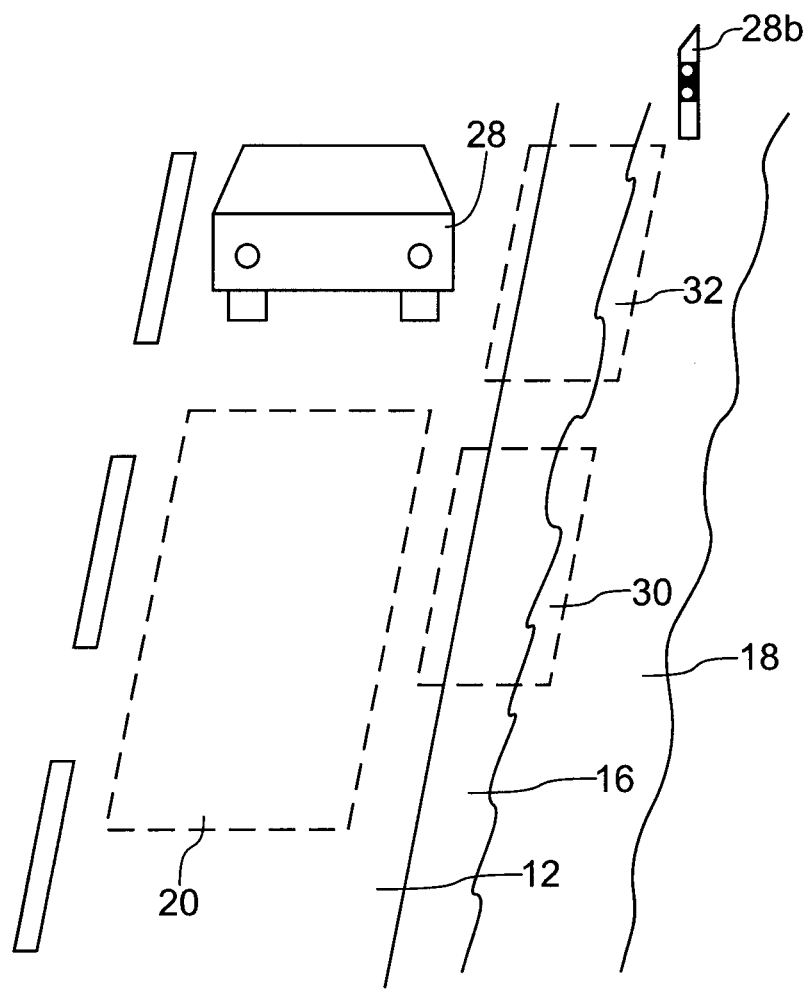
Figure 3:
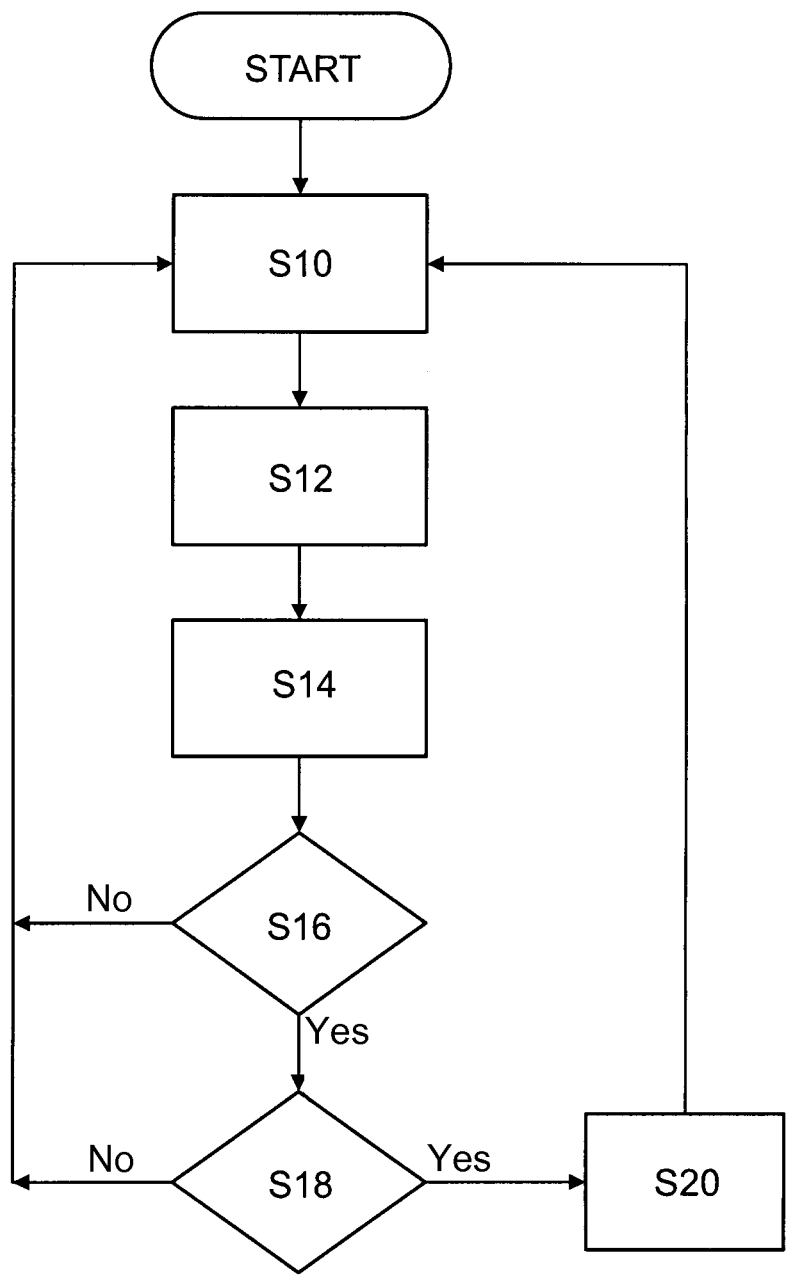
Figure 4:
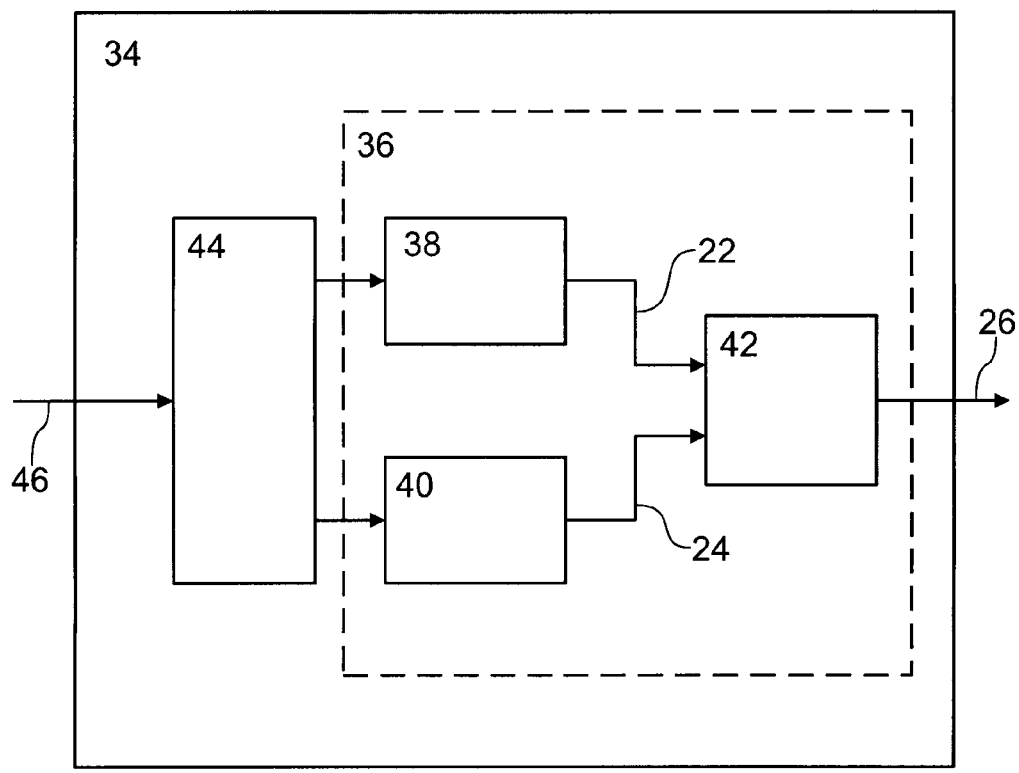

FIG. 1 shows a top view of a situation in which a vehicle equipped with a driving environment sensor has unintentionally left the roadway and is driving partly on the roadway periphery;

FIG. 2 shows an example of an image captured with a camera used as a driving environment sensor, said image showing a situation in which the vehicle with the camera has unintentionally left the roadway and is driving partly on the roadway periphery;

FIG. 3 shows a flow chart of an exemplary embodiment of an algorithm for assisting in returning a vehicle after leaving the roadway according to the invention, said algorithm being implemented in a driver assistance system; and FIG. 4 shows a block diagram of an exemplary embodiment of a device according to an embodiment of the invention, for assisting in returning a vehicle after leaving the roadway, said device being adapted to be used in a driver assistance system.

DETAILED DESCRIPTION OF EXAMPLE EMBODIMENTS OF THE INVENTION

In the following description like, functionally like and functionally connected elements may be designated by like reference numerals. Absolute values are given only by way of example in the following and are not to be understood as limiting the invention.

FIG. 1 shows a vehicle 10 which has partly and unintentionally left a roadway 12 of a country road and which is driving with the wheels of its right side on an unpaved periphery 18 of the roadway. The roadway 12 is separated from the periphery 18 by a transition 16, which may have formed, for example, by erosion and which may form a step with different height differences between the paved roadway 12 and the unpaved periphery 18. In addition, the transition 16 may have different widths, as indicated in FIG. 1.

The vehicle 10 is equipped with a camera 14 as a driving environment sensor for capturing the region ahead of the vehicle 10. The detection range of the camera 14 is indicated by the dashed reference lines 15. Within the detection range 15 of the camera 14 there is a vehicle 28 driving ahead of the vehicle 10. Instead of a camera other types of driving environment sensors can also be used. For the purpose of the present invention particularly those driving environment sensors are suitable which provide information from which the surface contour of the ground ahead of the vehicle can be evaluated and the free space ahead of the vehicle can be detected or evaluated.

Such information is in particular provided by imaging sensors such as stereo cameras or high-resolution radar or lidar sensors, which are therefore particularly well suited for the present invention. For the speed range common on country roads the information for said range should be available with sufficient quality and certainty up to approximately at least 50 m ahead of the vehicle. If the vehicle is to act autonomously it is recommended to provide usually redundant information and analyzations.

Using one or more driving environment sensors which are oriented forwardly, i.e. in the direction of travel of the vehicle 10, the roadway contour is basically measured or estimated according to the invention and as described in more detail hereinafter, so as to obtain information for returning the vehicle 10 to the roadway 12. Furthermore, the space ahead of the vehicle 10 is searched for obstacles such as the ahead-driving vehicle 28 or obstacles on the periphery 18 and the transition 16 such as, for example, delineator 28b (see FIG. 2) which the vehicle 10 must not hit while being returned to the roadway 12.

FIG. 2 shows an image of the region ahead of vehicle 10, captured by the camera 14. In the captured image a detected free space 20 between the vehicle and the ahead-driving vehicle 28 and first and second transition points 30 and 32, evaluated as noncritical (or thus, permissible or suitable) for returning the vehicle to the roadway 12, are marked by dashed rectangles (bounding boxes), as well as the obstacle 28b on the periphery 18. The bounding boxes 20, 30, and 32 are obtained by the algorithmic image analysis according to the invention and described below.

FIG. 3 shows a flow chart of an algorithm according to an embodiment of the invention, for assisting in returning a vehicle to the roadway 12 after leaving the roadway 12, said algorithm generating the bounding boxes 20, 30, and 32 indicated in FIG. 2. The algorithm is implemented in a driver assistance system as part of the operating software of said system and processes data generated by driving environment sensors such as camera 14, which data comprise information regarding the area or region ahead of the vehicle such as illustrated in FIG. 2. In a first step S10, the algorithm, after having been started, receives data from one or more driving environment sensors, for example from camera 14 of the vehicle 10 shown in FIG. 1. The algorithm analyzes the received data with regard to different characteristic features such as the surface contour of the ground ahead of the vehicle and the contours of ahead-driving vehicles. As part of this analysis, different objects are classified as roadway 12, roadway periphery 18, ahead-driving vehicle 28, and obstacles 28b in the path of travel, using the characteristic features and as illustrated in FIG. 2.

In a further step S12 the received data are further analyzed to detect a transition 16 between the roadway 12 and the roadway periphery 18, which can, for example, occur using typical characteristic features such as step formation, variations in color, surface structure, etc.

In a subsequent step S14 a free space 20 is detected on the roadway between the vehicle itself and the ahead-driving vehicle 28. Here, also the free space beside the roadway is assessed in the region where the vehicle is expected to drive. This step can also take into account the event of an obstacle 28b being present on the periphery 18 or the transition 16, which represents a collision risk for the vehicle if the vehicle continues on its path. In this event a maneuver should immediately be initiated to prevent a collision. To take into account an event like this, obstacles on the periphery 18 or the detected transition 16 can be marked, for example, in step S14. This marking can then be analyzed in the following test steps as described to initiate the required collision avoidance maneuver. The maneuver can be to decelerate the vehicle as much as possible and then return it to the roadway with reduced speed, at a suitable point of transition, as the case may be, or even immediately, in particular if the distance from the obstacle 28b is short. For all other events the procedure continues with the steps described below.

In the subsequent step S16 the transition 16 detected in step S12 is checked as to its suitability for returning the vehicle. For this purpose the algorithm can make use of different evaluation criteria. For example, the height difference between the roadway periphery 18 and the roadway itself and/or the width of the transition 16 can be measured or estimated. For the check the height difference or the width can now be compared to a threshold value which can be preset, for example, as a function of the speed (high speed: smaller threshold value, low speed, larger threshold value) and vehicle properties (off-road/road vehicle: larger/smaller threshold value, passenger car/truck, low/high vehicle center of gravity: smaller/larger threshold value). If the comparison shows the height difference or the width to be smaller than the threshold value, this is signaled correspondingly by a first signal 22 (see FIG. 4) (branch labeled "Yes"). Otherwise, the algorithm jumps back to step S10, where again it receives data from the driving environment sensors (branch labeled "No").

In the situation shown in FIG. 2 the first signal 22 can, for example, indicate a first transition location or area also called a transition point 30 of the transition 16 evaluated as noncritical (and thus, permissible or suitable for returning the vehicle to the roadway), and a second transition area or point 32 of the transition 16 evaluated as noncritical (and thus, permissible or suitable). The indication of areas or points 30 and 32 can comprise an estimated or measured position of these points.

In the subsequent step S18 the free space 20 detected in step S14 is checked as to its suitability for returning the vehicle. First of all it is checked whether the measured or estimated free space 20 is sufficient to return the vehicle to the roadway 12 without colliding with the ahead-driving vehicle 28. If the free space 20 is evaluated as being sufficient for returning the vehicle, it is evaluated in connection with the transition points 30 and 32 detected in the preceding step S16 and evaluated as noncritical. In the situation illustrated in FIG. 2 it is determined that the free space 20 is suitable for returning the vehicle only in connection with the transition point 30, since the transition point 32 is located at a level with or adjacent to the ahead-driving vehicle 28 and therefore is not suitable for returning the vehicle, because there is no free space at this point. In addition, in step S18 it is checked whether obstacles on the periphery 18 or the transition 16 such as the delineator 28b have been marked in the preceding step S14. If this is the case it can be assessed whether a collision with a marked obstacle is imminent, in particular an estimation can be made as to when such a collision would be imminent at the current speed. If the assessment indicates, for example, that a collision is imminent even before reaching the transition point 30, this can be signaled accordingly to initiate a collision avoidance maneuver as described above. As a result a second signal 24 is generated by step S18, signaling the free space 20 to be sufficient for returning the vehicle at the transition point 30, or signaling the presence of obstacles on the roadway periphery or the detected transition. Thereupon a branch leads to step S20 (branch labeled "Yes"), wherein a feedback signal 26 (see FIG. 4) for the transition point 30 or a feedback signal 26 for a maneuver for avoiding an imminent collision with an obstacle present on the roadway periphery or the detected transition is generated and issued. Subsequently, the algorithm jumps back to step S10, where again it receives data from the driving environment sensors. If it is determined in step S18 that no sufficient free space is available, the algorithm jumps back to step 510 immediately without branching into step S20 (branch labeled "No).

The two steps S16 and S18 can also run in parallel and transfer their result to step S20 directly, which then performs the check of the free space 20 as described above with regard to the two transition points 30 and 32 and/or the check for obstacles 28b on the roadway periphery 18 or the detected transition 16 and issues a feedback signal 26 as a function thereof.

FIG. 4 shows a block diagram of a device 34 for assisting in returning a vehicle after leaving a roadway, wherein said device may be implemented in software and/or hardware. For example, the device may be designed as an FPGA (Field Programmable Gate Array) which may be programmed to execute a method for assisting in returning a vehicle after leaving a roadway (as shown by way of example in the flow chart of FIG. 3). The device can alternatively be designed as a microprocessor or microcontroller which can be configured by a special program which implements a method as in FIG. 3. Other mixed forms of an implementation of the device are conceivable as well, for example, by implementing in hardware those parts of the method of the invention which are particularly computationally intensive, for example in the form of ASICs (Application Specific Integrated Circuits), and the other parts in software, which are executed by a standard microprocessor or microcontroller.

The device 34 shown in FIG. 4 receives the data 46 from one or more driving environment sensors of the vehicle, which are forwardly oriented and capture a region ahead of the vehicle such as is shown, for example, in FIGS. 1 and 2. In the present case the received data are to be the data from the camera 14 of FIG. 1 used as a driving environment sensor. First of all, the received camera data 46 are fed to a roadway leaving detection unit 44 which performs a special image analysis with the received camera data 46 to determine whether the vehicle is going to leave the roadway, has already left the roadway and is driving at least partly on a roadway periphery. If the unit 44 determines this to be the case, it communicates the received camera data 46 to an analyzation unit 36 of the device 34, which assumes one or more of the following tasks:

Detecting whether a transition between the roadway periphery and the roadway, in particular a height difference between the roadway periphery and the roadway, presents a risk.

Detecting and evaluating the available free space ahead of the vehicle.

Planning the best possible maneuver, e.g. braking and driving over an edge between the roadway periphery and the roadway at low speed or remaining on the shoulder or roadway periphery up to a point where a step between the roadway periphery and the roadway has a noncritical height and shape.

Performing a maneuver to return the vehicle to the roadway in which the appropriate steering torques and accelerations/decelerations are requested from the vehicle.

Assisting the driver in steering by way of a superimposed steering torque which the driver can override, or an asymmetrical (e.g. one-sided) brake intervention. Also in this aspect an acceleration/deceleration can be requested from the vehicle. This request can be overridden by the driver, however. The advantage of this aspect lies in the lower safety requirements than are required for an autonomous intervention.

To perform the above tasks the analyzation unit 36 has a transition detection and check unit 38, a free space detection and check unit 40 and a feedback signal generation unit 42. The transition detection and check unit 38 implements the steps S12 and S16 of the procedure shown in FIG. 3 and generates the first signal 22, while the free space detection and check unit 40 essentially performs steps S14 and S18 and generates the second signal 24.

The feedback signal generation unit 42 generates the feedback signal 26 from the signals supplied. For this purpose the feedback signal generation unit 42 can plan the best maneuver possible for returning the vehicle to the roadway in accordance with the task to be performed by the analyzation unit 36 and in accordance with predefined strategies, and it can generate the feedback signal such that it includes corresponding information for a (semi-)autonomous intervention in the steering and/or drive control system of the vehicle.

In the situation illustrated in FIG. 2, for example, the feedback signal can include, for an autonomous intervention, information for reducing the speed of the vehicle ahead of the position of the transition point 30 and information for generating steering torques at the position of the transition point 30, which autonomously steer the vehicle back from the roadway periphery 18 onto the roadway 12 at the transition point 30.

For a semi-autonomous intervention the feedback signal can include information for a one-sided brake intervention on the left side of the vehicle ahead of the position of the transition point 30 and for applying a superimposed steering torque at the transition point 30 to inform the driver to steer the vehicle to the left back onto the roadway 12 at the point 30.

In a particularly simple embodiment the feedback signal can also serve as a purely passive assist signal for the driver, which on reaching the point 30 signals to the driver acoustically and/or visually and/or haptically that a suitable position for returning the vehicle to the roadway 12 has now been reached.

The present invention enables a driver to be assisted in returning a vehicle after leaving a roadway if the vehicle is driving at least partly on the roadway periphery or shoulder. For this purpose the invention analyzes data from one or more driving environment sensors which capture the region ahead of the vehicle and, as a result of the analysis, generates a feedback signal which can be used either to signal to the driver a suitable point for returning the vehicle or to control a (semi-)autonomous intervention in the drive control system and/or steering of the vehicle. Compared to the state of the art the invention has the advantage that a driver is relieved in a stressful situation, the vehicle remains in a stable condition and thus accidents or even just damages to the vehicle such as tire defects can be prevented.

REFERENCE NUMERALS 10 vehicle
12 roadway
14 camera
15 detection range of the camera
16 transition between roadway and roadway periphery
18 roadway periphery
20 free space
22 first signal
24 second signal
26 feedback signal
28 preceding vehicle
28b delineator
30 first transition point evaluated as noncritical
32 second transition point evaluated as noncritical
34 return assist device
36 analyzation unit
38 transition detection and check unit
40 free space detection and check unit
42 feedback signal generation unit
44 roadway leaving detection unit
46 camera data

The invention claimed is:

1. A method of operating a driver assistance system of a vehicle for assisting in returning the vehicle (10) to a roadway after the vehicle has at least partially left the roadway (12) and is driving at least partially on a roadway periphery (18) laterally adjacent to the roadway, wherein the driver assistance system comprises an analyzation unit, and wherein the method comprises the following steps performed by the driver assistance system:
   receiving data from one or more driving environment sensors (14) of the vehicle that monitor a region ahead of the vehicle (S10),
   in the analyzation unit, analyzing the data to detect a transition (16) between the roadway and the roadway periphery (18; S12),
   analyzing the data to detect a free space (20) ahead of the vehicle (S14),
   checking whether the transition is suitable for returning the vehicle to the roadway, which includes checking whether a detected height difference or a detected width of the transition is smaller than a respective pre-defined threshold value, and issuing a corresponding first signal (22; S16),
   checking whether the free space is sufficient for returning the vehicle to the roadway, and checking whether obstacles (28b) are present on the roadway periphery (18) or on the transition (16), and issuing a corresponding second signal (24; S18), and
   generating a feedback signal (26) if the first signal indicates that the transition is suitable and the second signal indicates that the free space is sufficient, or if the second signal indicates that obstacles (28b) are present on the roadway periphery (18) or on the transition (S20).

2. The method according to claim 1, characterized in that the analyzing of the data for detecting the transition (16) includes detecting the height difference between the roadway periphery (18) and the roadway (12) and/or detecting a width of the roadway periphery.

3. The method according to claim 1, characterized in that the checking of whether the transition is suitable for returning the vehicle to the roadway further includes: classifying the transition as to an influence thereof on driving stability when being driven over by the vehicle, and the first signal is issued if the transition is classified as having less influence on the driving stability when being driven over by the vehicle than a predefined maximum influence.

4. The method according to claim 1, characterized in that a steering assist signal, a brake intervention signal and/or an acceleration signal is or are generated and issued as a function of the feedback signal.

5. The method according to claim 1, characterized in that the data include information for detecting and evaluating a surface contour of the ground ahead of the vehicle and the free space ahead of the vehicle.

6. A device in a driver assistance system of a vehicle for assisting in returning the vehicle to a roadway after the vehicle has at least partially left the roadway and is driving at least partially on a roadway periphery laterally adjacent to the roadway, comprising an analyzation unit configured and adapted to:
receive data from one or more driving environment sensors of the vehicle that monitor a region ahead of the vehicle,
analyze the data to detect a transition between the roadway and the roadway periphery,
analyze the data to detect a free space ahead of the vehicle,
check whether the transition is suitable for returning the vehicle to the roadway, which includes checking whether a detected height difference or a detected width of the transition is smaller than a respective pre-defined threshold value, and issue a corresponding first signal,
check whether the free space is sufficient for returning the vehicle to the roadway, and issue a corresponding second signal, and
generate a feedback signal if the first signal indicates that the transition is suitable and the second signal indicates that the free space is sufficient.

7. A driver assistance system comprising a device according to claim 6.

8. The driver assistance system according to claim 7, further comprising a signaling device configured and arranged to emit the feedback signal to the driver.

9. The driver assistance system according to claim 7, further comprising a device configured and arranged to generate control signals for a drive control system and/or a steering system of a vehicle as a function of the feedback signal such that the drive control system or the steering system of the vehicle is controlled by the control signals to return the vehicle to the roadway semi-autonomously or autonomously.

10. A method of operating a driver assistance system of a vehicle to assist in returning the vehicle onto a roadway after the vehicle has at least partially left the roadway and is driving at least partially on a roadway periphery laterally adjacent to the roadway, comprising the following steps performed by the driver assistance system:
receiving data from an environment sensor of the vehicle that monitors a region of the roadway and the roadway periphery ahead of the vehicle;
analyzing the data to detect a transition between the roadway and the roadway periphery by detecting at least one of a height difference, a surface structure variation, a step formation, or a color variation, between the roadway and the roadway periphery;
evaluating the data to determine whether at least one first area along the transition is suitable for driving the vehicle over the transition onto the roadway at the first area, and based on the evaluating making a determination that the first area is suitable issuing a first signal indicating that the transition is suitable at the first area;
in response to and dependent on at least the first signal indicating that the transition is suitable at the first area, with the driver assistance system performing at least one assistance function selected from the group consisting of:
issuing to a driver of the vehicle an alert indicating that the transition is suitable for driving the vehicle over the transition onto the roadway at the first area,
performing a semi-autonomous control assistance to assist the driver in controlling the vehicle to drive the vehicle over the transition onto the roadway at the first area, or
performing an autonomous control of a control system of the vehicle to drive the vehicle over the transition onto the roadway at the first area.

11. The method according to claim 10, wherein the step of analyzing the data to detect the transition comprises the detecting of the height difference between the roadway and the roadway periphery.

12. The method according to claim 11, wherein the step of evaluating the data to determine whether the first area is suitable comprises comparing the height difference to a maximum permissible value.

13. The method according to claim 10, wherein the step of analyzing the data to detect the transition comprises the detecting of the surface structure variation or the step formation between the roadway and the roadway periphery.

14. The method according to claim 10, wherein the step of evaluating the data to determine whether the first area is suitable comprises classifying the transition at the first area as to an influence thereof on driving stability of the vehicle when driving over the transition, and comparing the influence to a maximum permissible influence.

15. The method according to claim 10, further comprising the following steps performed by the driver assistance system:
analyzing the data to detect an unoccupied space on the roadway ahead of the vehicle,
evaluating the data to determine whether the unoccupied space is sufficient for the vehicle to return onto the roadway into the unoccupied space, and if so then issuing a second signal indicating that the unoccupied space is sufficient, and
wherein the at least one assistance function is performed only in response to and dependent on at least the first signal indicating that the transition is suitable at the first area, the second signal indicating that the unoccupied space is sufficient, and the first area being adjacent to the unoccupied space.

16. The method according to claim 10, wherein the roadway is a paved roadway, the roadway periphery is an unpaved shoulder, and the transition comprises a height step between the paved roadway and the unpaved shoulder.

* * * * *